United States Patent
Batfalsky et al.

(10) Patent No.: US 7,175,931 B2
(45) Date of Patent: Feb. 13, 2007

(54) INTERCONNECTOR PLATE WITH OPENINGS AND CONTACT ELEMENTS SEALED IN THE OPENINGS

(75) Inventors: Peter Batfalsky, Jülich (DE); Wilhelm Albert Meulenberg, Vijlen (NL); Lambertus Gerardus Johannes De Haart, Heerlen (NL)

(73) Assignee: Forschungszentrum Julich GmbH, Julich (DE)

( * ) Notice: Subject to any disclaimer, the term of this patent is extended or adjusted under 35 U.S.C. 154(b) by 374 days.

(21) Appl. No.: 10/297,281

(22) PCT Filed: May 19, 2001

(86) PCT No.: PCT/DE01/01922

§ 371 (c)(1),
(2), (4) Date: Dec. 4, 2002

(87) PCT Pub. No.: WO01/95416

PCT Pub. Date: Dec. 13, 2001

(65) Prior Publication Data

US 2003/0113609 A1    Jun. 19, 2003

(30) Foreign Application Priority Data

Jun. 5, 2000 (DE) ............................ 100 27 311

(51) Int. Cl.
*H01M 8/02*   (2006.01)
*H01M 8/12*   (2006.01)
*H01M 8/24*   (2006.01)

(52) U.S. Cl. ............................ 429/34; 429/35; 429/32
(58) Field of Classification Search ............... 429/32, 429/34, 35, 37–39, 245; 439/536
See application file for complete search history.

(56) References Cited

U.S. PATENT DOCUMENTS

| 5,034,288 | A  | * | 7/1991 | Bossel ................... 429/32 |
| 5,733,682 | A  |   | 3/1998 | Quadakkers |
| 5,827,620 | A  | * | 10/1998 | Kendall ................ 429/32 |
| 6,183,897 | B1 | * | 2/2001 | Hartvigsen et al. ..... 429/32 |
| 6,623,881 | B2 | * | 9/2003 | Badding et al. ........ 429/30 |
| 2002/0028367 | A1 | * | 3/2002 | Sammes et al. ......... 429/31 |
| 2002/0094465 | A1 | * | 7/2002 | Fleck et al. .......... 429/32 |

FOREIGN PATENT DOCUMENTS

| DE | 198 05 674 | 9/1999 |
| EP | 0 423 448 | 4/1991 |
| EP | 0 993 059 | 4/2000 |
| WO | 99/13522 | 3/1999 |
| WO | WO 9913522 A1 * | 3/1999 |

* cited by examiner

*Primary Examiner*—Gregg Cantelmo
(74) *Attorney, Agent, or Firm*—Andrew Wilford; Jonathan Myers

(57) ABSTRACT

The invention relates to a device for electrically contacting electrodes in high-temperature fuel cells. The inventive device is characterized by an interconnector plate with openings and contact elements, which are located therein and which are provided for electrically contacting electrodes. The contact elements protrude from both sides of the interconnector plate at a predetermined height, and the openings are sealed in a gas-tight manner.

15 Claims, 1 Drawing Sheet

INTERCONNECTOR PLATE WITH OPENINGS AND CONTACT ELEMENTS SEALED IN THE OPENINGS

CROSS REFERENCE TO RELATED APPLICATIONS

This is a national stage of PCT/DE01/01922 filed 19 May 2001 and based upon German national application 100 27 311.4 of 5 Jun. 2000 under the International Convention.

FIELD OF THE INVENTION

The invention relates to relates to a device for electrically contacting electrodes in high-temperature fuel cells.

BACKGROUND OF THE INVENTION

A fuel cell comprises a cathode, an electrolyte and an anode. The cathode is supplied with an oxidizing agent, for example, air, and the anode is supplied with a fuel, for example hydrogen.

Different fuel cell types are known, including for example, the SOFC fuel cell of the publication DE 44 30 958 C1 and the PEM fuel cell of the publication DE 195 31 852 C1.

The SOFC fuel cell is also known as a high-temperature fuel cell since its operating temperature can be up to 1000° C.

At the cathode of a high-temperature fuel cell oxygen ions are formed in the presence of the oxidizing agent. The oxygen ions traverse the electrolyte and recombine on the anode side with the hydrogen arising from the fuel to water. With the recombination, electrons are liberated and thus electrical energy is generated.

A plurality of fuel cells as a rule are electrically connected to one another by connecting elements and are mechanically joined by interconnectors with one another for producing greater electrical outputs. An example of a connecting element is the bipolar plate. By means of bipolar plates, fuel cells are stacked one upon another and connected electrically in series. This arrangement is known as a fuel cell stack. A fuel cell stack is comprised of the bipolar plates and the electrode-electrolyte units.

Interconnectors generally also serve as gas distributor structures apart from their electrical and mechanical characteristics. In the bipolar plates the gas distributor structures are realized by ribs with electrode contacts which separate the gas passages to supply the electrodes (DE 44 10 711 C1). Gas distributor structures ensure that the operating media are uniformly distributed in the electrode compartments (compartments in which the electrodes are found). The following problems can arise with fuel cells and fuel cell stacks:

- Metallic bipolar plates with a high chromium content form conductive chromium oxide cover layers;
- in operation there is an evaporation of chromium resulting in ageing characteristics within the fuel cell.
- Metallic bipolar plates with high aluminum content form $Al_2O_3$ cover layers which act detrimentally like an electrical insulator.
- In a fuel cell stack, between the known rigid bipolar plates and the electrode-electrolyte units, poorly conducting contact points can arise. These can arise from fabrication tolerances in the production of bipolar plates or electrode-electrolyte units.

OBJECTS OF THE INVENTION

An object of the invention is, therefore, to provide a device which ensures long-term stability of the electrical contacting of the electrodes in high-temperature fuel cells.

Another object is to provide a method of producing such a device.

SUMMARY OF THE INVENTION

The objects are achieved through a device in the form of an interconnector plate with openings and contact elements for the electrical contacting of the electrodes and whereby the contact elements on both sides of the interconnector plate project to a predetermined height and close the openings gas tightly, i.e. hermetically. This construction ensures that the current flow through the interconnector plate is ensured through the contact elements. Supporting and current conducting functions are thus decoupled and ensured through the interconnector plate or the contact elements. As a result one is largely free in the choice in the materials for the interconnector plate. It is advantageous to use high-temperature-resistant or refractor materials for the interconnector plate whereby also nonmetallic materials can be employed. As the contact elements, set or rivet heads, pins, wires and rivets or other shapes suitable for the purpose of current conducting and, especially, easily deformable material can be used. The contact elements are such that may be so incorporated in the interconnector plates that they close the openings in a gas-tight manner. The heights to which the contact elements project out of the interconnector plate as well as the spacings of the contact elements from one another can predetermine the heights and widths of the gas distributor structures. This results in a reduction in labor time and production cost.

According to a feature of the invention it is provided that all contact elements project to an identical height from the interconnector plate. In this manner, the electrical contact is ensured by all of the contact elements.

Especially advantageously, the contact elements contain at least 99.97% silver. The contact elements are then comprised of pure silver. Silver affords the advantage that it has long term stability under reducing and oxidizing conditions as a good current conductor since it forms no dense corrosion products which can increase the contact resistance. Other current conducting deformable materials can however also serve, especially noble metals, like for example, platinum (Pt), gold (Au) or palladium (Pd) as starting materials for the contact elements.

A high-temperature fuel cell can encompass such a device according to the invention. Because of the characteristics of the contact elements, like for example high-temperature resistance and oxidation resistance, long-term stable contacting of electrodes is effected with a reduction in the contact resistances in the high-temperature fuel cell.

Especially advantageously, a high-temperature fuel cell encompasses between the contact elements and an anode as the electrode an elastic nickel mesh. This nickel mesh serves as an additional means for ensuring uniform electrical contact between the anode and the contact elements via the grid points of the mesh and thus serves to compensate for the above-mentioned disadvantageous fabrication tolerances.

In a further embodiment of a high-temperature fuel cell, the latter encompasses between the contact element and a cathode as the electrode, an elastic silver mesh. This serves as an additional means for ensuring uniform electrical contact between the cathode and the contact elements through the grid points of the mesh and thus to compensate for poor transverse conductivity of the cathode. By the use of silver mesh, the number of contact elements can be significantly reduced.

The fuel cell stack encompasses at least two such high-temperature fuel cells. In this manner higher outputs are produced.

The objects are further achieved through a method of making such a device. It is thus provided that an opening is formed in an interconnector plate having the area of the contact element and contact elements are form-fittingly introduced into the opening. Then the contact elements are connected with the interconnector plate so that the openings are closed in a gas-tight manner.

The gas-tight connection can be brought about for example by upsetting the contact elements. The upsetting operation can be effected at room temperature. If a uni-axial press is used, the upsetting of the contact elements can be carried out uniformly in that all of the contact elements project at identical heights from the interconnector plate. Through the upsetting of the material and the thermal expansion upon heating, the openings in the interconnector plate are closed in a gas-tight manner by the contact elements. There are however also other processes conceivable by means of which the openings in the interconnector plate can be closed in a gas-tight manner by the contact elements, including for example soldering processes. With such a process it is conceivable to form, in a feature of the invention, a fuel cell or fuel cell stack.

BRIEF DESCRIPTION OF THE DRAWING

In the following, the invention is explained based upon the description of an embodiment with reference to the accompanying Figure.

In FIG. 1 five contact elements 3 have been illustrated. The interconnector plate 2 is fabricated in this case from an iron-chromium, aluminum alloy with 5% of an aluminum component and has a thickness of 200 μm. All of the set heads project uniformly above and below at interconnector plate 2 by one mm. The set heads 3 contain at least 99.97% silver (pure silver). The spacing between the openings is uniform and about 1 cm over the entire area of the interconnector plate 2. The silver set heads 3 afford the advantage that at a use temperature of 800° C. and both under reducing conditions and also oxidizing conditions they conduct the current well with long term stability. The evaporation rate of the silver set heads 3 is held low because of the small surface area exposed to the gas flow. A further advantage is obtained from the fact that the height of the silver set head 3 projects from the interconnector plate 2 is 0.9 mm in that with this embodiment, no additional gas distributor structure 4 is required. Additional time-intensive and gas-intensive working steps like milling or deep drawing of components for producing the gas passages are thus avoided. In FIG. 1 a total of four gas distributor structures above the interconnector plate and four gas distributor structures below the interconnector plate have been indicated, of which, to save space, only one has been designated with a reference character. With the anode 5 of the fuel cell 10 shown as the lower fuel cell in FIG. 1, the contact with the silver set heads 3 is ensured by means of an elastic nickel mesh 6. The elastic silver mesh 6 has a thickness of 250 μm and a mesh width of 200 μm. The diameter of the wires amounts to 125 μm. For the cathode 7 of the fuel cell 10 shown as the upper fuel cell in FIG. 1, the contact with the silver set head 3 is ensured by means of an elastic silver is mesh 8. The elastic silver mesh has a thickness of 0.7 mm and a mesh width of 0.9 mm. Without limitation of the invention, however, other values can be selected.

Figure 1:
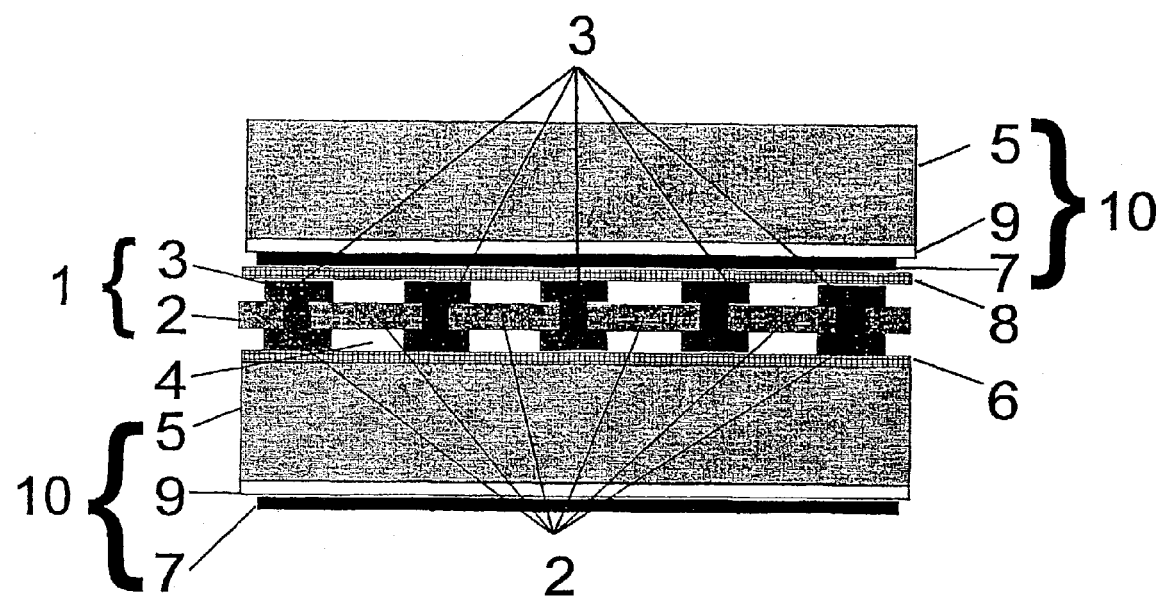
FIG. 1 shows schematically a cross section through two fuel cells 10 each comprised of an anode 5, a cathode 7 and an electrolyte 9. The fuel cells 10 are connected together by the device 1. The device 1 is comprised of an interconnector plate 2 in which openings and so-called contact elements 3 are incorporated. The openings are closed in a gas-tight manner with the contact elements 3.

Further variants as to the configuration of the gas distributing structures are also possible with respect to the shape and spacing of the contact elements in the interconnector plate. It is for example conceivable that, as in the bipolar plates, the contact elements can be configured as through-going ribs which separate the gas passages form one another to supply the electrodes, for example such that rectangular contact elements close corresponding openings in a gas-tight manner.

The invention claimed is:

1. A high-temperature fuel cell connector assembly comprising, between electrodes of two high-temperature fuel cells to be connected together, an interconnector plate formed with throughgoing holes, and a respective unitary contact element containing at least 99.97% silver extending through each of said holes, hermetically closing said holes, and projecting beyond the interconnector plate on opposite sides thereof to a predetermined height into contact with the electrodes.

2. The high-temperature fuel cell connector assembly defined in claim 1 wherein all of said unitary contact elements project from the interconnector plate to the same height.

3. The high-temperature fuel cell connector assembly defined in claim 2, further comprising a metal mesh between each of the unitary contact elements and the respective electrode.

4. The high-temperature fuel cell connector assembly defined in claim 3 wherein one of said electrodes is a fuel cell anode and the respective mesh between the unitary contact elements and said one of said electrodes is an elastic nickel mesh.

5. The high-temperature fuel cell connector assembly defined in claim 4 wherein the other of said electrodes is a fuel cell cathode and the respective mesh between the unitary contact elements and said other of said electrodes is an elastic silver mesh.

6. The high-temperature fuel cell connector assembly defined in claim 3 wherein one of said electrodes is a fuel cell cathode and the respective mesh between the unitary contact elements and said one of said electrodes is an elastic silver mesh.

7. A high-temperature fuel cell connector assembly comprising, between electrodes of two high-temperature fuel cells to be connected together, an interconnector plate formed with throughgoing holes, and a respective unitary contact element composed of a noble metal extending through each of said holes, hermetically closing said holes, and projecting beyond the interconnector plate on opposite sides thereof to a predetermined height into contact with the electrodes.

8. The high-temperature fuel cell connector assembly defined in claim 7 wherein all of said unitary contact elements project from the interconnector plate to the same height.

9. The high-temperature fuel cell connector assembly defined in claim 8, further comprising a metal mesh between each of the unitary contact elements and the respective electrode.

10. The high-temperature fuel cell connector assembly defined in claim 9 wherein one of said electrodes is a fuel cell anode and the respective mesh between the unitary contact elements and said one of said electrodes is an elastic nickel mesh.

11. The high-temperature fuel cell connector assembly defined in claim 10 wherein the other of said electrodes is a fuel cell cathode and the respective mesh between the unitary contact elements and said other of said electrodes is an elastic silver mesh.

12. The high-temperature fuel cell connector assembly defined in claim 9 wherein one of said electrodes is a fuel cell cathode and the respective mesh between the unitary contact elements and said one of said electrodes is an elastic silver mesh.

13. A method of interconnecting two high-temperature fuel cells comprising:
   (a) providing an interconnector plate with throughgoing holes;
   (b) inserting into each of said holes a respective unitary contact element containing at least 99.97% silver so that the respective unitary contact element extends through the respective hole, hermetically closes the respective hole, and projects beyond the interconnector plate on opposite sides thereof to a predetermined height; and
   c) inserting the interconnector plate with the unitary contact elements thereof extending through the respective holes between electrodes of two high-temperature fuel cells to be connected together so that projecting portions of the unitary contact elements contact the electrodes.

14. A high-temperature fuel cell connector assembly comprising, between electrodes of two high-temperature fuel cells to be connected, an interconnector plate provided with throughgoing holes and unitary contact elements of a noble metal received in and sealing said holes and projecting from said plate into contact with electrodes.

15. The high temperature fuel cell connector assembly defined in claim 1 wherein the interconnector plate is comprised of an iron-chromium-aluminum alloy, as a high-temperature resistant material.

* * * * *